Oct. 12, 1926.

G. A. KROHN

BRAKE

Filed June 5, 1924

1,603,120

INVENTOR
Gustave A. Krohn

Patented Oct. 12, 1926.

1,603,120

UNITED STATES PATENT OFFICE.

GUSTAVE A. KROHN, OF COARSEGOLD, CALIFORNIA.

BRAKE.

Application filed June 5, 1924. Serial No. 718,059.

My invention relates particularly to brakes for motor vehicles and one of its objects is to provide a brake being capable of unlimited adjustment.

Another object of my invention is to provide a brake that is very accessible for relining.

A further object is to provide a brake having means for winding the brake band on a drum when it is desired to apply the brake, the band being of sufficient resiliency for this purpose.

A still further object is to provide a brake having the same leverage during its application, accomplishing a snubbing action, employing a rigid band, the application of said brake being continuous, and when released will not drag on the brake drum.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
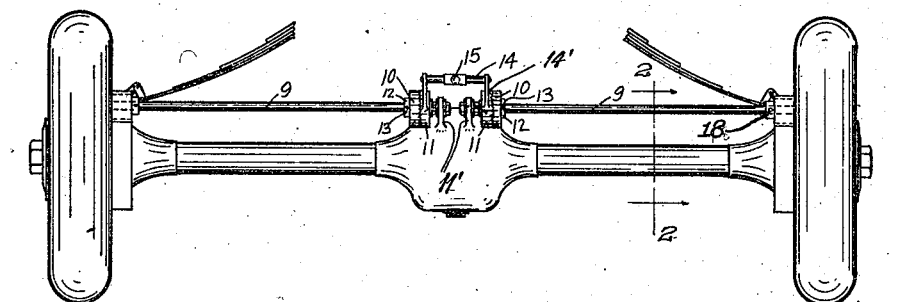
Figure 1 is a rear elevation of an axle and differential housing of a motor vehicle showing the application of the brake forming the subject matter of the present invention.
Figure 2:
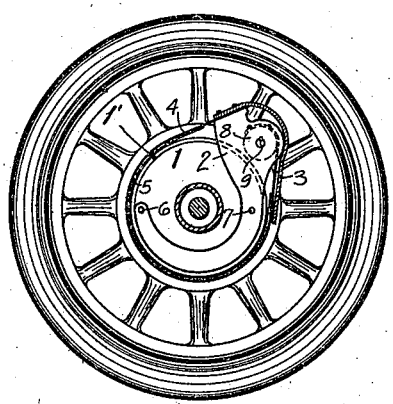
Figure 2 is a side elevation of one wheel of the vehicle showing the brake applied to the brake drum thereof.
Figure 3:
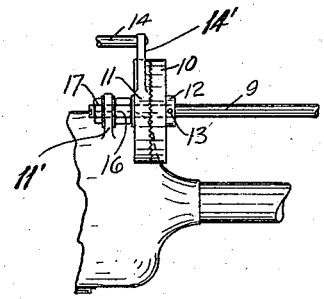
Figure 3 is a rear elevation of one set of adjusting collars forming a portion of the invention and their immediate associated elements.

Referring to the drawings in detail the reference numeral 1 indicates a flange of the rear axle housing as shown and 1' a brake drum of the usual structure which is applied to the wheels of the vehicle in the usual manner. A substantially arcuate shape casting 2 is bolted to the flange as at 6 and 7 and secured to said casting at its upper end is a metal guard 3. The brake band is provided with a lining 5 which is adapted to encircle a substantial portion of the drum and is fixed to the band for that purpose. A drum 8 is keyed to a shaft 9 which has its outer end passing through the casting 2 and the brake 4 is wound about the drum 8 when the brake is applied. Adjustably mounted collars 10 and 11 form a connection between the brake application means and the shaft 9, the collar 10 being secured to the inner end of the shaft 9 by a clamping member 12 which is fixed to the shaft by a pin 13. A clamping member 18 is also secured to each shaft 9 and engages the castings 2 as shown in Figure 1 of the drawings. Adjustment is made by setting the collars 10 and 11 at various positions on the shaft 9, the collars having their confronting faces serrated in the form of ratchet teeth to provide the necessary connection therebetween when applying the brakes.

While it is true two brakes are usually necessary for motor vehicles and two are shown in Figure 1 of the drawings, the parts of one brake have been thus far described in view of the fact that the parts of the respective brakes are duplicates, therefore the description of one will suffice, but the means for applying the brakes are adapted to operate both brakes simultaneously and now it becomes necessary to describe the parts to conform to the application means, and the collars 11 are loosely secured to the inner ends of the shafts 9 which pass through ears 11' rising in parallelism from the differential housing as clearly shown in Figure 1 of the drawings. A spacing nut 16 is arranged between each collar and the ears 11' and nuts 17 are secured to the inner ends of the shafts 9 to retain said shafts in the ears. A connecting rod 14 has its ends secured to projections 14' rising from each of the collars 11 and fixed midway the ends of the connecting rod 14' is a rod 15 which has its opposite end in connection with the foot pedal or hand lever of the vehicle.

The operation is as follows:

When the foot pedal or hand lever is applied, the rod 14 is drawn in a forward position and this action is transmitted through the shafts 9 as shown to the drums 8. The drums 8 are turned in a forward direction to wind the brake bands 4 thereabout, thus bringing great friction between the brake linings 5 and the drums 1 as will be readily apparent. When the brake is released, the brake band being of a resilient nature it will spring away from the brake band 1 and thereby eliminate drag as is common in brakes of the usual construction.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A brake of the character described comprising a fixed substantially arcuate shape casting, a connecting rod passing through said casting for rotation, a drum secured to the connecting rod for rotation therewith, a guard secured to the casting at one end and overlying the drum, a resilient band secured to said casting and having one end fixed to the drum as and for the purpose specified.

2. The combination with a motor vehicle, its rear axle housing flange and differential housing respectively of a brake for the vehicle comprising a substantially arcuate shaped casting secured to the rear axle housing flange of the motor vehicle and extending therefrom in an upward direction, a resilient band secured to said casting at its upper end, a drum receiving the opposite end of the resilient band, a guard fixed to said casting at the juncture of the resilient band thereto and overlying said drum, a connecting rod passing through the casting for rotatable movement and secured to said drum, an ear rising from the differential housing of the motor vehicle and receiving the inner end of the connecting rod for rotation therein, a collar fixed to said end, a collar loosely mounted on said end in face to face relation with the collar first mentioned, and both of said collars having their faces formed with coacting teeth, and means connecting said loosely mounted collar with the brake application means of the vehicle for rotating the connecting rod.

GUSTAVE A. KROHN.